(12) United States Patent
Lebrun

(10) Patent No.: US 8,495,508 B2
(45) Date of Patent: Jul. 23, 2013

(54) METHOD AND APPARATUS FOR CONTEXTUAL BASED SEARCH ENGINE AND ENTERPRISE KNOWLEDGE MANAGEMENT

(76) Inventor: George Lebrun, San Antonio, TX (US)

( * ) Notice: Subject to any disclaimer, the term of this patent is extended or adjusted under 35 U.S.C. 154(b) by 0 days.

(21) Appl. No.: 13/075,139

(22) Filed: Mar. 29, 2011

(65) Prior Publication Data
US 2011/0246920 A1    Oct. 6, 2011

Related U.S. Application Data

(60) Provisional application No. 61/319,125, filed on Mar. 30, 2010.

(51) Int. Cl.
*G06F 3/048* (2006.01)
(52) U.S. Cl.
USPC .......................................... 715/758; 715/769
(58) Field of Classification Search
USPC ................................................. 715/769, 758
See application file for complete search history.

(56) References Cited

U.S. PATENT DOCUMENTS

| 6,731,307 | B1 * | 5/2004 | Strubbe et al. ................ 715/727 |
| 7,058,897 | B2 * | 6/2006 | Matsuda ....................... 715/758 |
| 2005/0234883 | A1 * | 10/2005 | Szeto et al. ....................... 707/3 |
| 2007/0271340 | A1 * | 11/2007 | Goodman et al. ............ 709/206 |
| 2008/0059314 | A1 * | 3/2008 | Kirchoff et al. ................ 705/14 |

\* cited by examiner

*Primary Examiner* — Andrea Leggett
(74) *Attorney, Agent, or Firm* — DLA Piper LLP (US)

(57) ABSTRACT

The system provides a system for monitoring a plurality of communications mediums on a network such as the Internet or an enterprise intranet and for providing context based supplemental information based on the conversation. The supplemental information is presented in one embodiment in the form of a matching media object (MMO) and can be easily shared between users of the system, either concurrently or on a time delayed basis (i.e. the next time a user logs onto the system). The system provides a communications tool that facilitates chats, blogs, discussions, or any type of social media for a plurality of users. Conversations on the tool are parsed to determine an area of interest to the users and appropriate MMOs are provided based on that context.

2 Claims, 11 Drawing Sheets

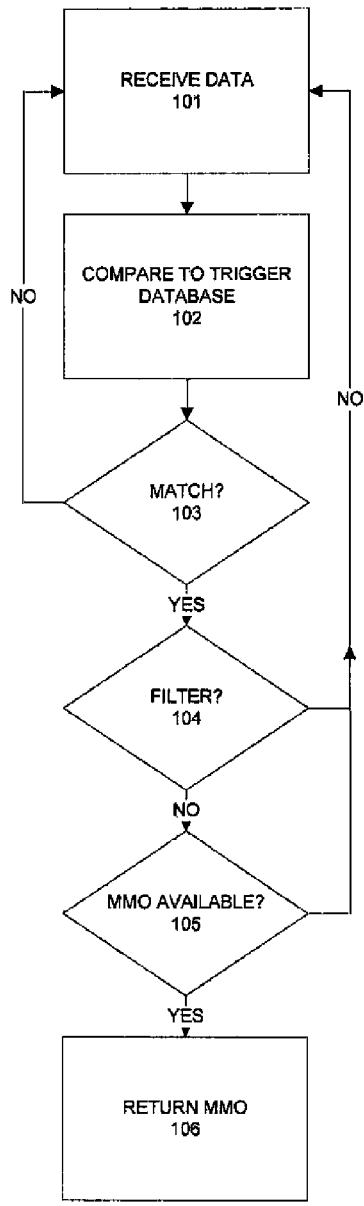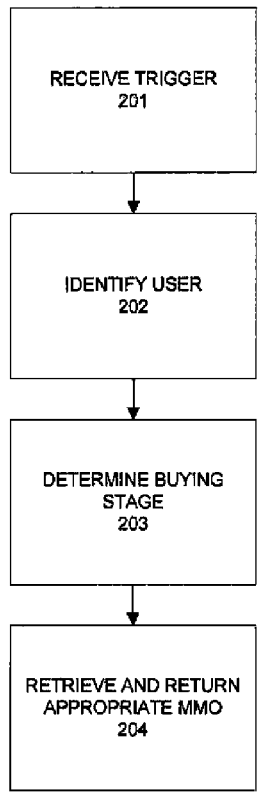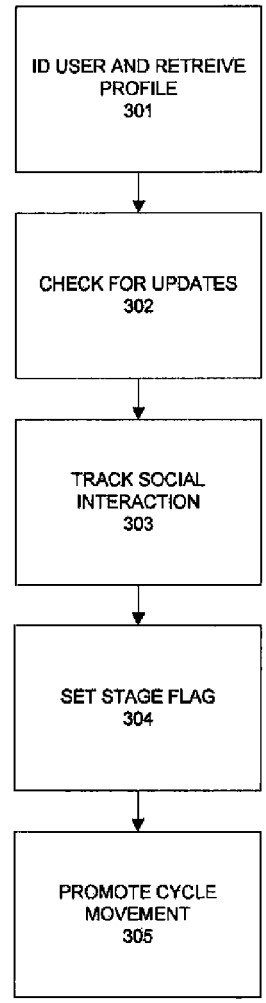
FIGURE 1
FIGURE 2
FIGURE 3

DASHBOARD 1201

TOTAL USERS 3,225

BUYING CYCLE SUMMARY — Ending Phase JAN 2010

| Starting Phase | Change | |
|---|---|---|
| 10% | -5 | 5% Attention |
| 75% | -15 | 60% Interest |
| 15% | +10 | 25% Desire |
| 0% | +10 | 10% Action |

Users advanced in Buying Cycle 40% 1,290
Users who purchased from this tool 28% 903

TOP ACTIVE USERS 1202

| Last | | |
|---|---|---|
| Biccoda | Walter | VISITING |
| Popovich | Thomas | BUYING |
| Duncan | Fran | CHATTING |
| Wolfe | Wiley | RECOMMENDING |
| Price | Joshua | ADVANCING |
| | | Expert |
| | | Referrer |
| | | Rerrer |

OVERVIEW  USERS  PRODUCTS  CHATS  BRANDS

1203 MATCHING MEDIA CLICKTHROUGHS

SELECT: Comparisons ▶
Coupons
Endorsements
Case Studies
Advertisements
24u
Survey Attention
Interest
Desire
Action TOP MMOs CLICKED 1204

Product           C63 AMG
Advertisement     Mercedes Benz in the 21st Century
Product           S600

24u SELECT FROM RECENT POLLS: ▶ 1205

My buying decisions are swayed by

Friends 58%
Coupons / Savings 27%
TV Commercials 8%
Nothing 7%

MOST USED KEYWORDS 1206

| Name | # |
|---|---|
| expense | 2399 |
| S Class | 1723 |
| leather | 1233 |
| v12 | 1203 |
| 2 door | 987 |
| 4 door | 879 |
| convertible | 887 |
| expensive | 2399 |
| SE Class | 885 |

MOST CALLED MMOs 1207

| Name | # |
|---|---|
| C300 Sport | 2399 |
| C300 Luxury | 1723 |
| C350 Sport | 1233 |
| E Class | 1203 |
| E350 Sedan | 987 |
| E350 Sedan | 879 |
| E63 AMG | 887 |
| S-Class | 885 |
| S350 Sedan | 245 |
| Coupes | 207 |

FIGURE 12

METHOD AND APPARATUS FOR CONTEXTUAL BASED SEARCH ENGINE AND ENTERPRISE KNOWLEDGE MANAGEMENT

This patent application claims priority to U.S. Provisional Patent Application No. 61/319,125 filed Mar. 30, 2010 which is incorporated by reference herein in its entirety.

BACKGROUND

1. Field of the Invention

The invention relates to a context-based search engine that returns a set of search results based on conversations occurring over a variety of digital communication tools. The search results are contextually relevant to the specific conversation-taking place. The system can be used in an enterprise or consumer environment to enhance user experience and to enable users to easily discover and access services and assets in an enterprise, or it can be used in a consumer environment.

2. Background of the Invention

The ability to find information on a network, whether it is an open network such as the Internet, or a closed network such as an enterprise network, depends on the ability to ask the correct question and to understand the large number of responses that arise from undertaking a search. In an enterprise, there may be a tree-based structure for leading a user to the correct location of information that the user may desire to see. For example, if the user is attempting to find out information about enterprise health plans, the user may need to first go to the human services web page, then find a suitable link for benefits, find a link for health plans, and then find the health plan of interest. This type of approach requires the user to make the correct decisions along the path to end up at the correct and desired information. Often, users remain unaware of benefits, resources, and assets in an enterprise because there is no effective way to notify the user of such resources when it is clear that the user is interested.

The same type of problems are found in marketing and advertising on the Internet. In typical advertising, a company presents an ad to the largest number of consumers such as in newspapers, magazines, television, radio, billboards, etc. There is some attempt to provide targeting of a particular group by understanding the demographics of the particular mass media being used to serve the ad. For example, television ratings are broken down by, among other things, sex and age. Therefore, if a company seeks to market to young men, the company might choose to advertise in a sports milieu where the demographics favour young males. Such an approach is open loop in the sense that the company hopes for a certain demographic to be exposed to the ad but can't be sure.

It has been a goal of marketing and advertising to be able to present information to a consumer at the moment the consumer is engaging in an activity that is related to the product or when the consumer is thinking about the product category. The Internet has been able to provide this ability to some degree.

For example, when a user enters text into a search engine, an advertiser can assume that the user is interested in the subject matter of the search. If the consumer were to search for cars, for example, the search results can be served with an advertisement for cars. Marketers believe that such a consumer is more receptive to an advertisement at such times, and strive to target such consumers and serve directed ads to them at that time. Such advertisements are not mass advertisements but are sent in those situations where the context of the search term indicates an interest in a particular product or product category.

SUMMARY OF THE SYSTEM

The system provides a system for monitoring a plurality of communications mediums on a network such as the Internet or in an enterprise intranet, and for providing context based supplemental information based on the conversation. The supplemental information is presented in one embodiment in the form of a matching media object (MMO) and can be easily shared between users of the system, either concurrently or on a time delayed basis (i.e. the next time a user logs onto the system). The system provides a communications tool that facilitates chats, blogs, discussions, twitter, or any type of social media for a plurality of users. Conversations on the tool are parsed to determine an area of interest to the users and appropriate MMOs are provided based on that context.

In one embodiment, the system is used in an enterprise to allow users to discover and access services and assets during conversations and communications with other enterprise members. The system includes a number of stages including parsing a conversation or dialog on the enterprise network, identifying the context and sentiment of the conversation, identifying assets and/or services that are responsive to the context, presenting the assets in the form of an MMO; allowing a user to transmit the MMO in a drag and drop manner to other users of the enterprise network whether in the dialog or not.

The system is not limited to enterprise employees, but to any users given access and permissions to the enterprise network. In addition, there may be tiers of permissions for users of the system that may control the MMO's that can be presented during a dialog or may limit the recipients of MMO's to be transferred.

In another embodiment, the system can also be used to provide context-based marketing. In one embodiment, the system will also assess what stage of the buying cycle a user is in (awareness, interest, desire, action) and provide contextual marketing that is appropriate to the buying cycle stage. This is done by identifying a product, product category, assessing the context, assessing the sentiment, identifying a proper MMO, measuring the effectiveness of the MMO that is flashed into the tool, and then using a series of algorithms to determine where the user resides in the buying cycle. Once the current stage is identified, the system is designed to help to move the user through the buying cycle faster than without the system.

BRIEF DESCRIPTION OF THE DRAWINGS

FIG. 1 is a flow diagram illustrating an embodiment of the system.

FIG. 2 is a flow diagram illustrating an embodiment of sales flow detection in an embodiment of the system.

FIG. 3 is a flow diagram illustrating sales stage tracking in an embodiment of the system.

FIG. 12 is an example of an embodiment of a brand manager interactive dashboard.

DETAILED DESCRIPTION OF THE SYSTEM

Figure 4:
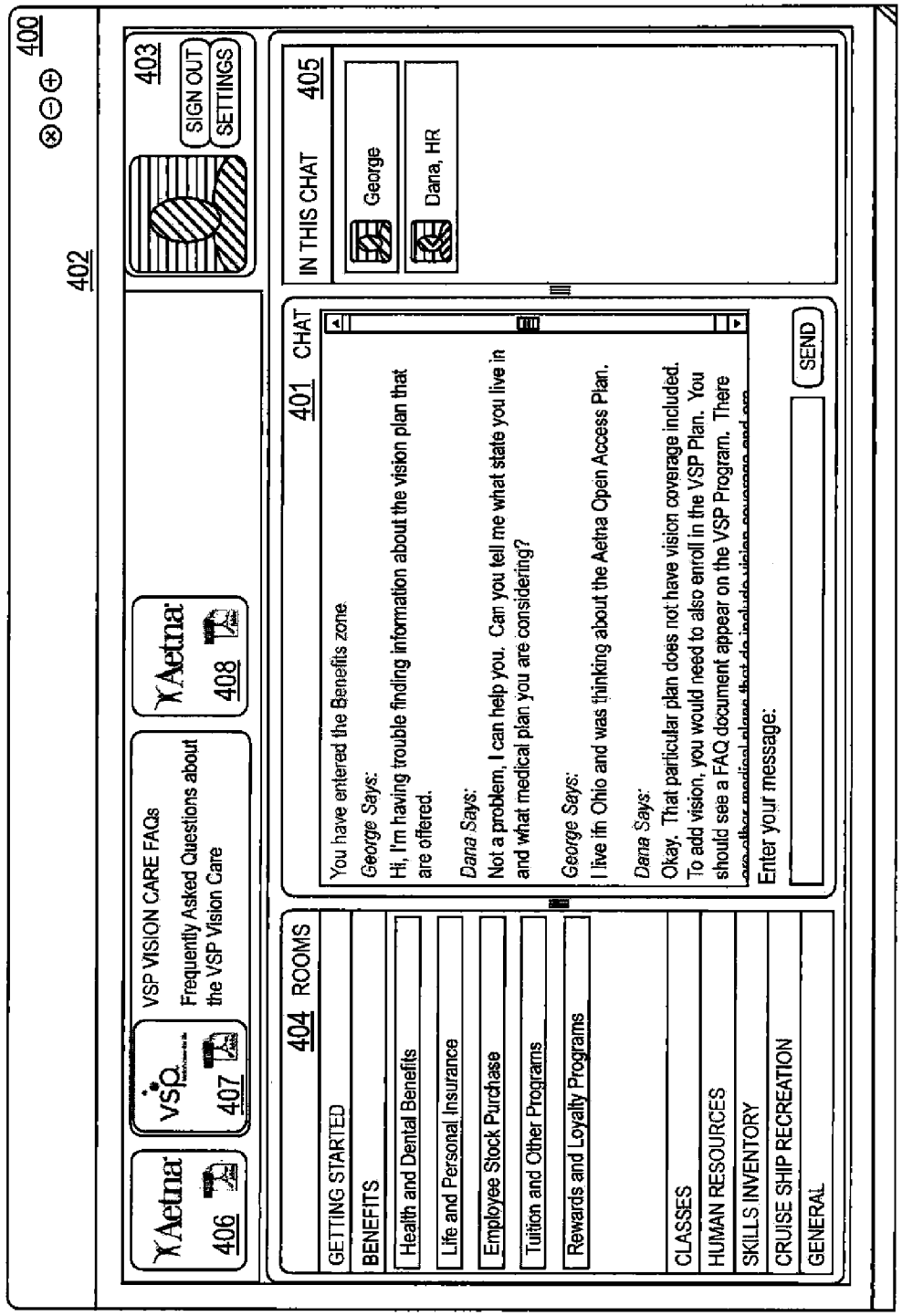
FIG. 4 is an example of a System Panel in an embodiment of the system.

In one embodiment, the system provides a System Panel, which is used to facilitate communications and to provide MMO's as appropriate based on the conversations. An example of an embodiment of a System Panel is illustrated in FIG. 4. The System Panel 400 comprises a number of regions that are used to provide the features of the system. The System Panel includes a communication region 401. In the embodiment of FIG. 4, the communication region 401 is in chat mode. However, the System Panel also supports other types of communications, including, but not limited to, email, blogs, discussions, any type of social media, VOIP, texts, or any other type of communication for a plurality of users.

The upper right region 403 in this embodiment of the System Panel displays the user of the System Panel and includes sign in/sign out capabilities and settings control. The System Panel 400 also includes a region 401 that displays MMO's as they are retrieved and recalled in response to conversations, communications, and/or searches that take place in the System Panel.

Region 404 displays the rooms that are available to the user 403 in the System Panel. In an enterprise, the number and types of rooms available to a user may be dependent on the position and permission level of the user. The user may use the room region 404 to select the department or area with which the user is interested in communicating. After selecting a room, the appropriate person or persons for that room may appear in the chat member region 405. In other instances, the user 403 may select a chat partner and the rooms region 404 will display the appropriate room for that conversant.

In some cases, the user may define custom rooms related to the users responsibilities and team members. Much like an email system can define single email addresses for one or more recipients, the System Panel allows the user to define groups of one or more enterprise members in rooms. The rooms region 404 can have a hierarchical selection system that can be tied into the enterprises existing structure if desired.

One advantage of the system is that even when the user does not know the correct department or the correct person to contact for information, the user can simply start typing the area of interest in the chat region 401 of the System Panel and the correct room and person will pop up automatically so that the user can then initiate a conversation as desired.

During a conversation, the user simply communicates questions or requests for information with the other participants. In the example of FIG. 4. The conversation is related to benefits, specifically vision plans. As the conversation progresses, the context of the conversation is determined by the system, and appropriate MMO's are retrieved and then displayed in the MMO panel 402.

An advantage of providing MMO's during a conversation is that while the system may retrieve one or more general MMO's based on the request of the user, the responses give by the other participant are also parsed for context. Those replies may result in more specific or responsive MMO's being generated at in the MMO panel.

In one embodiment of the system, the user and the other participant will see the same MMO list displayed in MMO panel 402, so the responder can refer to one or more specific MMO's in the list and identify them to the requester as being the appropriate item of interest. In other cases, as in the example of FIG. 4, the responder can ask appropriate questions (i.e. what state are you in) so that the fine tuning of the response can lead to more specific and appropriate MMO's being provided.

Figure 5:
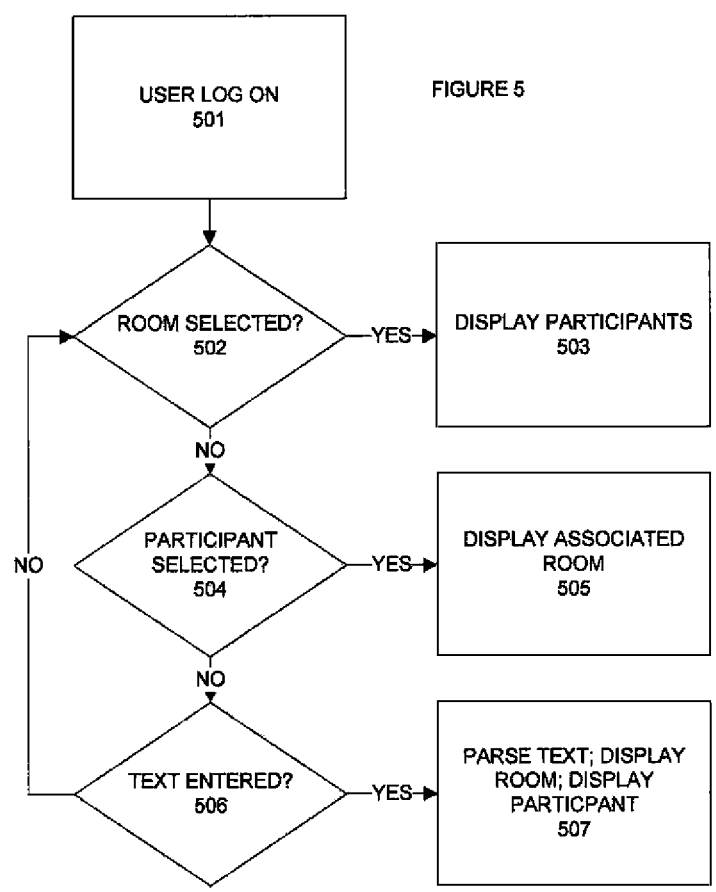
FIG. 5 is a flow diagram illustrating log-in in an embodiment of the system.

The operation of the System Panel during log on is illustrated in the flow diagram of FIG. 5. At step 501 a user logs onto the system. This initiates the display of the System Panel and at the same time the system retrieves the users profile, permissions, and preferences.

At decision block 502 it is determined if the user has selected a room from room region 404. If so, at step 503 the system displays the participants associated with that room in region 405. If not, the system proceeds to decision block 504. At 504 it is determined if the user has selected a participant. As noted above, there are a plurality of ways for a user to set up a conversation, one of which is to identify a participant or participants of the conversation. If the user has selected one or more participants at step 504, the system updates the room region 404 at step 505 to highlight the room associated with the chosen participant.

If the user has not selected a room at 502 or a participant at 504, the system checks at decision block 406 to determine if the user has entered text. If so, the system parses the text at step 507 and determines the most likely intended participant and room of interest to the user. In some cases, the user may need to enter more text for the retrieval of participant and room information to take place. If there is not text entered at step 5406, the system returns to step 502.

The flow of FIG. 5 illustrates the steps when a user logs onto the system. When a participant is identified in a System Panel, that user is alerted that there is a pending conversation and allows that participant to confirm that they will take part in the conversation. Until the participant is available, the avatar for the participant will indicate that the participant is not yet available (e.g. may be grayed out or have a waiting indicator of some sort associated with the avatar).

Figure 6:
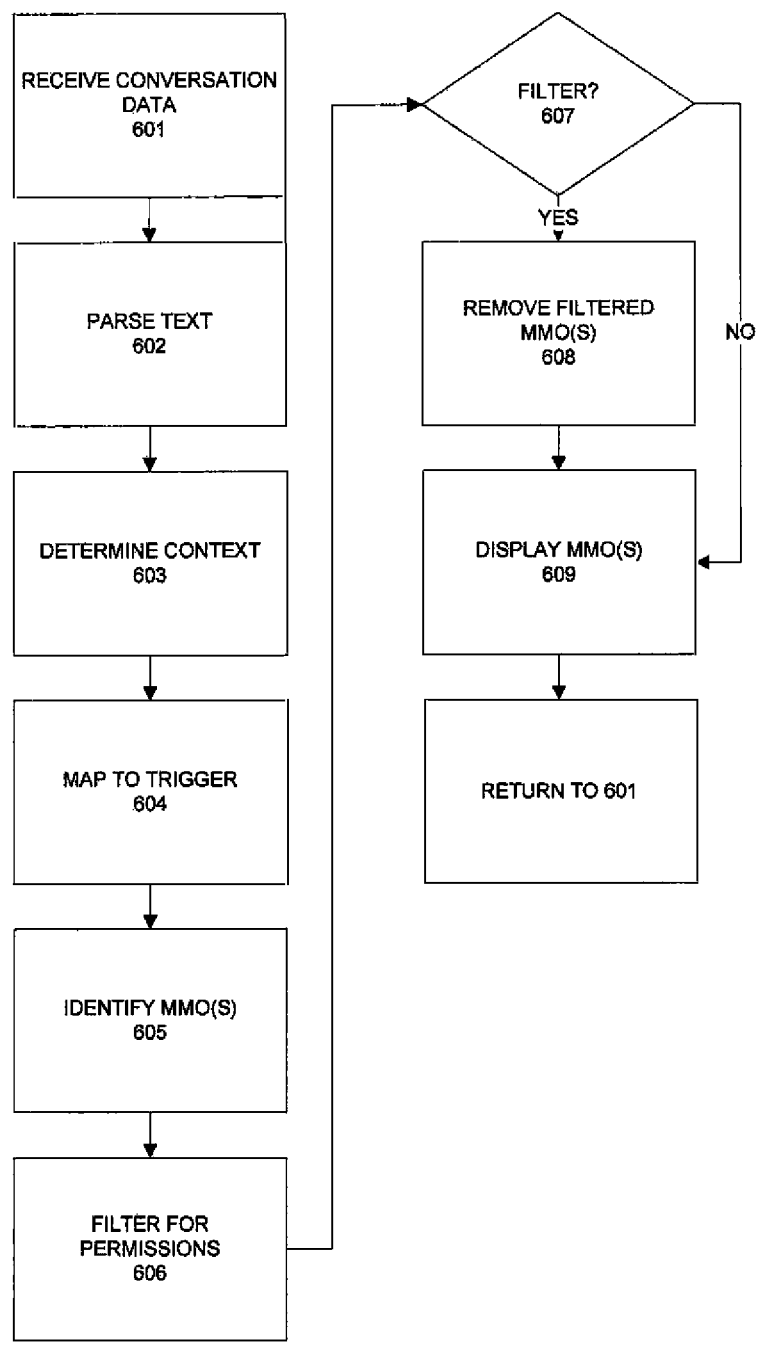
FIG. 6 is a flow diagram illustrating the operation of the system during conversation via the System Panel.

FIG. 6 is a flow diagram that illustrates the operation of the system during a conversation. At step 601 the system retrieves data from the conversation panel. The data comprises text from the conversation. The retrieval can be each time there is a response or it can be at some other frequency. At step 602 the system parses the text, looking for keywords and other cues as to intent and/or context.

At step 603 the system determines the context of the conversation. This can be accomplished in a plurality of ways. In one embodiment, the system uses metadata associated with the participants of the conversation (e.g. position, department, etc) to aid in determining context. For example, if the responder is from human resources, then the context is likely to relate to human resources. The system may also look back to a certain amount of the conversation to aid in determining context. This may be the last number of entries (e.g. last 6 lines of conversation) or some other amount.

At step 604, the system uses the context and keywords to map the conversation to one or more MMO triggers. These triggers are associated with an MMO and when present, indicate that a particular MMO is an appropriate association for the conversation taking place. At step 605 the MMOs associated with the trigger or triggers are identified.

At step 606, the system filters the participants and the possible MMOs for permission restrictions. Some MMOs can only be viewed by certain users or users with certain permission or departmental clearances. At step 607 it is determined if the possible MMOs should be filtered. If so, the system removes the filtered MMOs at step 608. If not, and after step 607, the system displays the MMOs in the display region 402 of the System panel 400 at step 609. The system then returns to step 601 to continue monitoring the conversation.

Figure 7:
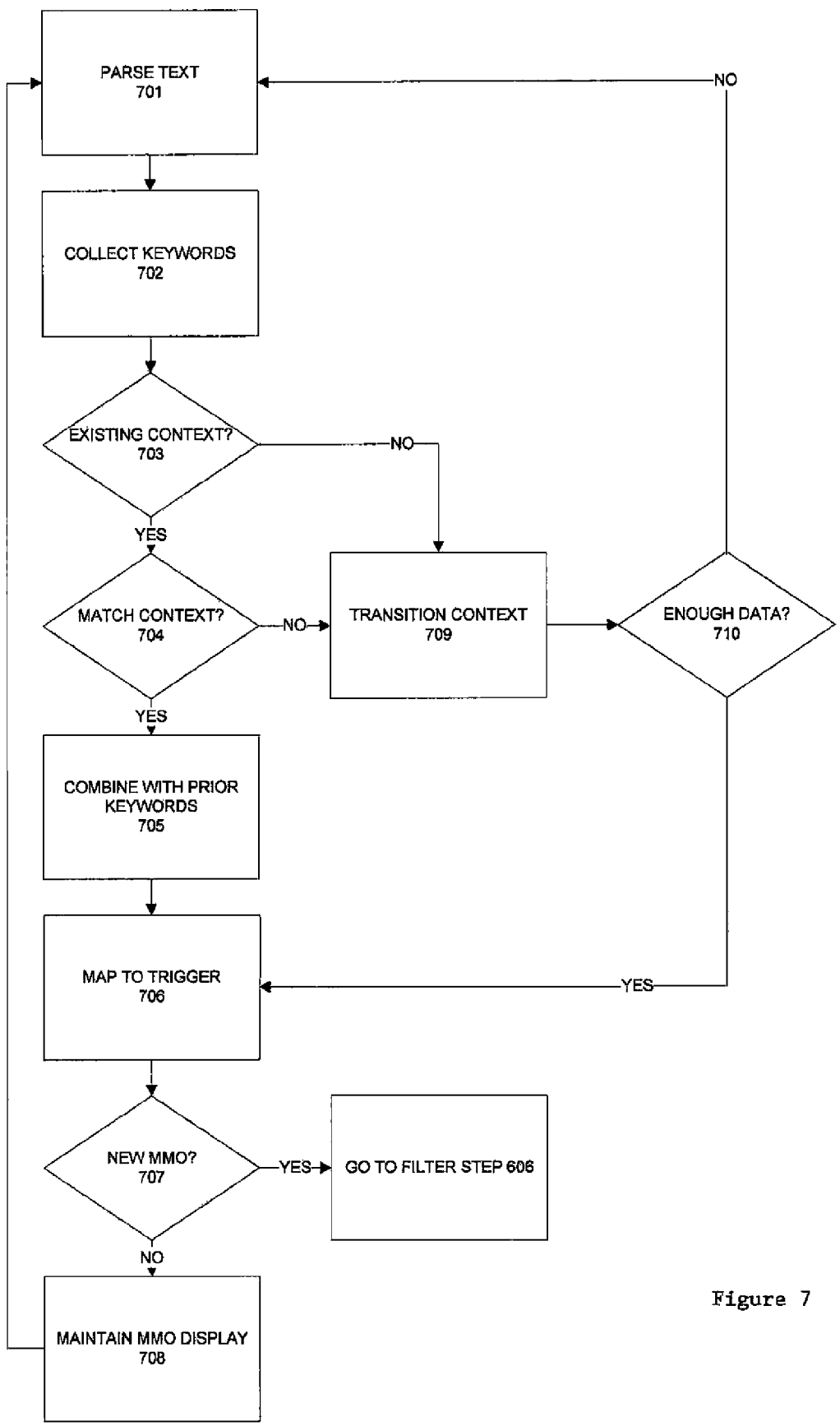
FIG. 7 is a flow diagram illustrating the identification of an MMO in an embodiment of the system.

The parsing of text and identification of context is described in connection with the flow diagram of FIG. 7. At step 701 the system parses the text for keywords and collects the keywords at step 702. At decision block 703 the system determines if there is an existing context based on prior analysis. If so, the system proceeds to step 704 to determine if the collected keywords match the current context that has been determined.

If so, the system proceeds to step 705 and combines the collected keywords with prior keywords from the same context. In this manner, as discussions proceed in the same context, the system can provide more accurate MMOs based on additional contextual information. At step 706 the system maps the current analysis to MMO triggers.

At step 707 it is determined if the triggers will result in new MMOs being identified compared to the MMOs that are currently displayed. If so, the system provides the new MMOs to the filter step 606 of FIG. 6. If there are no new MMOs identified at step 707, the system maintains the MMO display at step 708 and returns to step 701.

Returning to decision block 703, if there is no pre-existing context, or if the current keywords do not match the current context at step 704, the system proceeds to step 709 for a context transition (either from a prior context or from no previous context). The system then proceeds to step 710 to determine if there is enough data to determine a new context. If so, the system proceeds to step 706 to map the analysis to MMO triggers. If not, the system returns to step 701.

MMO

An MMO in the system can be a video clip, audio clip, image, document, people, rating and review, and the like. An MMO can also be a combination of one or more of such media types. An MMO is associated with a list of triggers that represent keywords and context that will result in a particular MMO being presented in a conversation. An MMO may be responsive to a plurality of triggers. An MMO may be stored as an object with associated metadata. MMO's may also have a file structure that includes a list of permissions that can be used to determine if a particular user is allowed to see and/or use the MMO.

In one embodiment, an MMO might appear on a participants System Panel but not on the user's System Panel. This may occur when the participant is in a more senior, sensitive, or restricted position than the user. For example, if the user is discussing salary and benefits, and the user is conversing with a participant in HR, the HR participant may see one or more MMO's related to salary, while the user will not see those MMO's. In this case, the MMO will allow the participant to find information that might be responsive to questions by the user. The participant can then use the proper judgement in providing permitted information only to the user.

Triggers

Triggers are words, phrases, contexts, images, sounds, user actions, and other phenomena tied to the broadcast and event that will cause the retrieval and presentation of content to the user. The detection of a trigger causes the system to take action on the trigger, determining if there are MMOs that can be presented based on the trigger.

The trigger definitions are useful because they combine keywords with context to define an association with an MMO. There may be a plurality MMO's for which the same keywords would result in an association, while the context will result in only one or some of the MMO' being provided. The context can be determined from a variety of factors, including department of the user and the participants, history of the conversation, particular combinations of keywords, certain keywords that are associated with context, positive or negative responses to the presentation of an MMO, or other factors.

MMO Presentation and Sharing

As noted above, when an MMO is considered relevant to a conversation, it is delivered for display in region 402 of one or more of the participants System Panels. In one embodiment of the system, the display region shows each MMO as a rectangular icon in region 402. The icon may identify the MMO as a document, pdf, video and/or audio file, web link, and the like. In the example of FIG. 4, the MMO's 406, 407, and 408 are each pdf files that have descriptions of various health plans offered by the enterprise. In the embodiment of FIG. 4, the vision plan MMO 407 shows an expanded descriptive portion to the right which gives a summary of the MMO so that the user need not open it if it doesn't seem to be what the user wants to see.

In one embodiment, clicking on an MMO will create a pop-up window. This window contains additional information that can vary based on the MMO type. For example, for a product MMO, there are tabs showing ratings & reviews of the product, short description, long description of the product, ratings on the whether the MMO was helpful to the user or not. Documents contain links to open and/or download the document locally.

In another embodiment, mousing over an MMO gives some additional information, clicking once on an MMO gives additional information as noted above, and double clicking on an MMO (or using an Open command after single clicking) will open the MMO.

Figure 8:
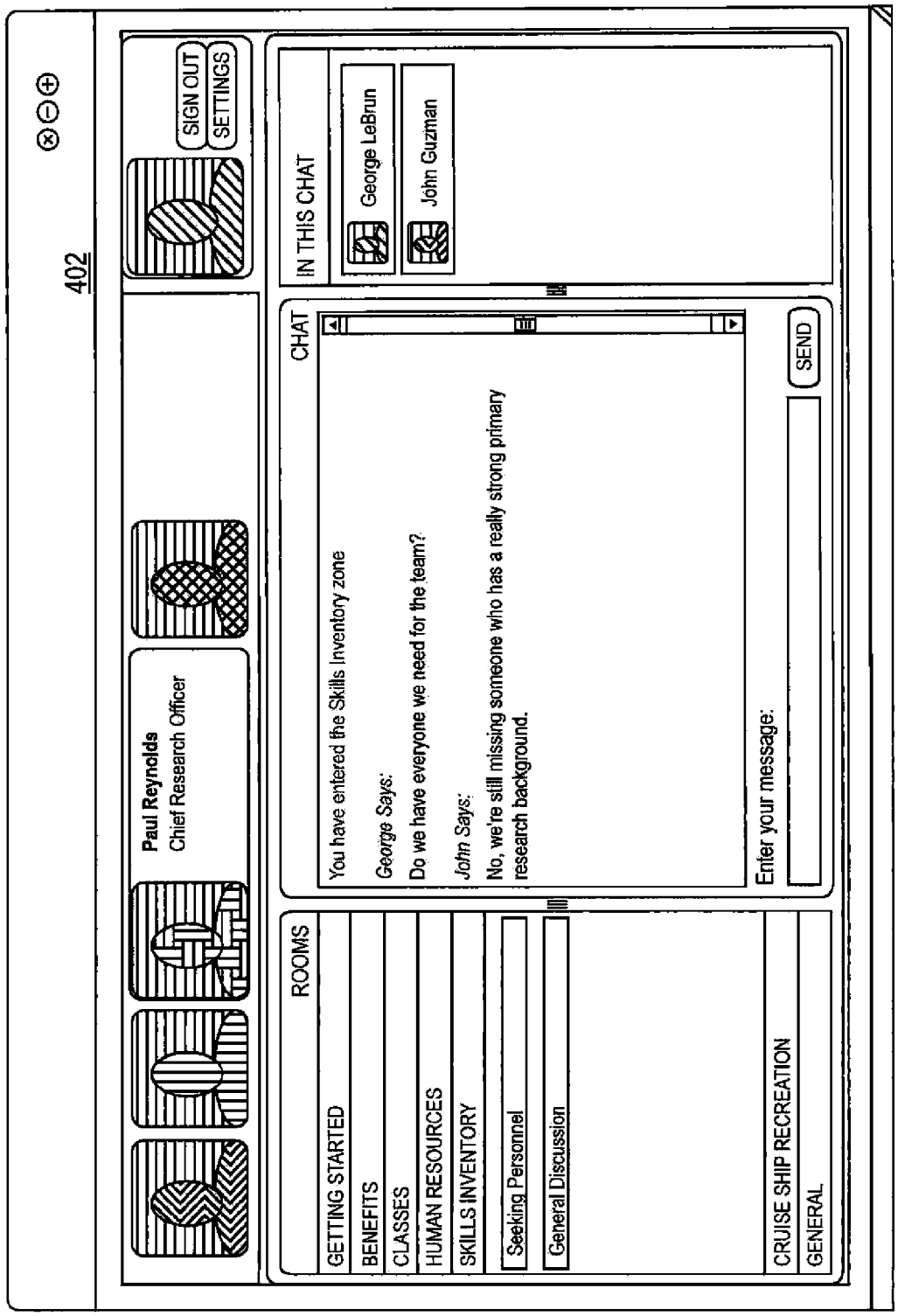
FIG. 8 is an alternate embodiment of the System Panel.

In FIG. 8, the MMO's represent personnel whose expertise is responsive to the conversation. Personnel MMO's can appear as thumbnail photographs of the person in question. A user can learn more about each MMO by mousing over for some additional information or by clicking for more detailed information. MMO's can appear in a variety of formats without departing from the scope and spirit of the system.

In one embodiment, region 402 becomes a scrollable field when more MMO's are presented than can fit in the region, including MMO's from earlier in the conversation. The user is then free to scroll back and forth in region 402 to find. MMO's from earlier or later in a conversation. In one embodiment, when a user scrolls to an earlier MMO, the text region changes to the location that caused the MMO to appear. In another embodiment, scrolling back and forth in the text region will cause the appropriate MMO's to appear in region 402.

Sharing of MMO's

Figure 9:
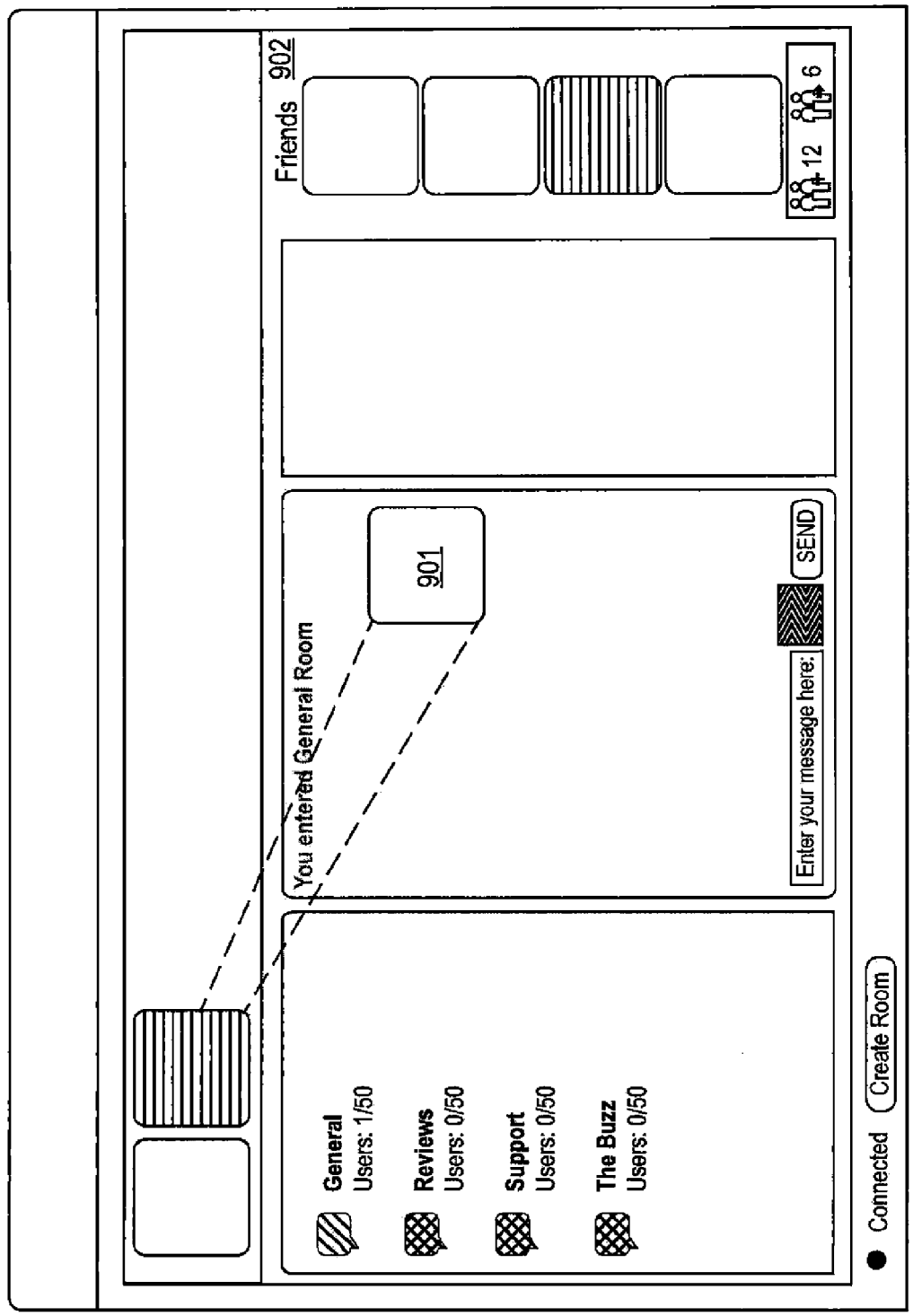
FIG. 9 illustrates MMO drag and drop in an embodiment of the system.

An advantage of the system is that MMO's can be easily transported to users in the system using drag and drop, right click send options, and other methods of sharing. Referring to FIG. 9, it shows an MMO 901 being dragged toward a friends list 902.

Figure 10:
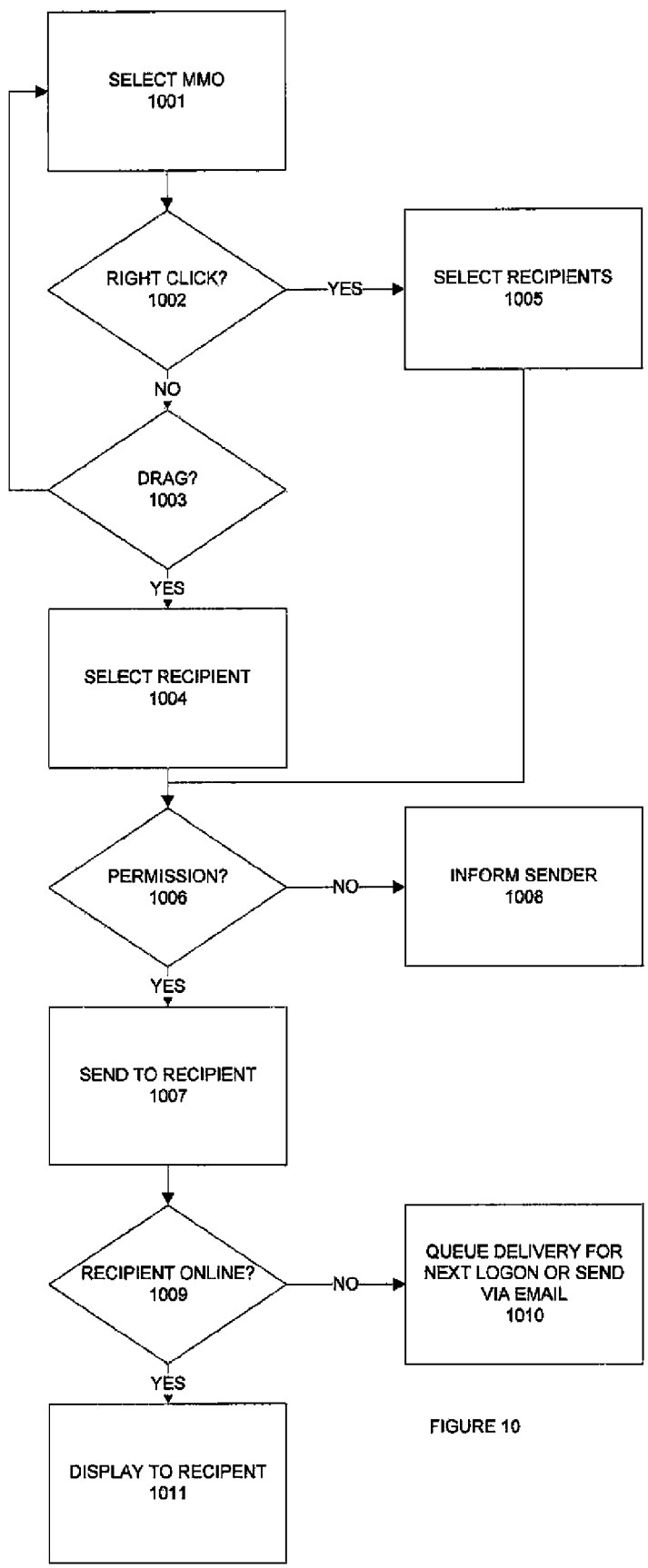
FIG. 10 is a flow diagram illustrating an embodiment of MMO sharing in the system.

FIG. 10 is a flow diagram of the operation of sharing an MMO in one embodiment of the system. At step 1001 an MMO is selected. At decision block 1002 it is determined if the user right clicks on the MMO. If so, this indicates that the user will be emailing the MMO and the recipient is selected at step 1005. If not, the system proceeds to decision block 1003 to determine if the user is dragging the MMO. If not, the system returns to step 1001. If so, the system proceeds to step 1004. When dragging the MMO, the user can drag it over the avatar of another user of the system, either in a conversation region or a friend region of the System Panel. (Note that, although not shown, the user can also drag the MMO to a file icon to store the MMO in the user's file system).

At step 1004 the user selects a potential recipient of the MMO. After step 1004 or 1005, the system proceeds to decision block 1006 to determine if the recipient of the MMO has the permission level to receive the MMO. If not, the system informs the sender at step 1008. If so, the system sends the MMO to the recipient at step 1007.

At decision block 1009 it is determined if the recipient is online. This is typically for the drag and drop method of sending versus the email method. If the user is not online, the system proceeds to step 101 and queues the MMO for deliver at next login of the recipient or via email as desired. If the recipient is online (e.g. using the System Panel), the system displays the MMO in the display region 402 of the recipients System Panel.

When a recipient receives an MMO from another person using the system, it appears immediately in their System Panel as any other MMO object but with attributes indicating that it has been sent to them by another user. These attributes can include a modified appearance (e.g. a colored border), appearance modified by an additional graphic indicating the recommendation, mousing over the MMO displays the additional text "Recommended by username" and user graphic, and clicking the MMO displays the additional text "Recommended by username" and user graphic.

Rating and Reputation

Each MMO can be rated for usefulness by users of the MMO. In one embodiment, rating of an MMO may be permission limited. The rating of an MMO can be for any number of characteristics and might be provided by the original creator of the MMO. In some embodiments, there are universal rating categories of MMOs. When the MMO represents a person, the rating is referred to herein as "reputation". For example, if a person self-identifies as having experience in a particular field, a person who reviews that person's MMO or works with that person, can rate that person on their proficiency in that area. This leads to reputation points for that person that can be read when looking at that person's MMO. In some embodiments, the person with the highest reputation in a particular field will show in a particular position in the MMO region when displayed. In other embodiments, the MMO of the highest rated person will be highlighted in some manner to indicate the high reputation.

Contextual Marketing

In one embodiment, the system is designed to drive commerce from social conversations and to collect both qualitative and quantitative data from the conversations taking place within the applications communication tools.

The Contextual Marketing System is made up of user components including a communication tool such as chat or discussion boards or other social media via a System Panel that publishes a library of Matching Media Objects (MMO's) of participating brands.

The application also allows users to friend each other and whether they are friends or strangers to help one another in their purchase decision-making process. The products or services can come from a wide variety of topics.

Libraries of MMOs can be loaded into the System. Matching media consists of video clips, audio clips, images, coupons, and documents. Any product can also contain ratings & reviews. One additional aspect of MMOs is that it could also be a list of user profiles (each user profile can be drilled down into where we can see additional media like video clips, etc.)

In one embodiment, the system can import a database of friends, and/or members from outside companies like Facebook, DELL or a System community. The system could access elements from the user record in that database, but also add a corresponding record on the product's own database to contain additional information (profile specifics etc) to allow for some of the contextual dragging actions in the product.

In other embodiments, the System can provide social media services independently of a company environment and provide contextual marketing based on the context of social interactions. In some embodiments, the System is used in a community that is interested in a particular service or product category, without necessarily being associated with a particular company. For example, the System could be used in a social network for car fans, pet lovers, geographic groupings, magazines, and the like.

FIG. 1 is a flow diagram of one system for reviewing chat input and for selecting contextual marketing MMOs based on a chat transcript and context. In general, the system does the following. The system parses chat transcripts, metadata associated with media objects, content associated with included URLs, and in some embodiments performs image analysis to identify words, phrases, metadata, and/or objects that may be identified as triggers that will be used to cause one or more MMOs to be presented to the participants in the social media.

Triggers are words, phrases, contexts, images, sounds, user actions, and other phenomena tied to the broadcast and event that will cause the retrieval and presentation of content to the user. The detection of a trigger causes the system to take action on the trigger, determining if there are MMOs that can be presented based on the trigger.

In one embodiment, the triggers are stored in a central database that manages the selection and provision of the MMOs of the system. This database might be supplemented by user generated keywords or other media types that are of interest to a particular user.

As noted above, the system tracks metadata of a chat or social media activity, including the chat text of a broadcast to look for words and/or phrases that are of interest to the user. FIG. 1 is a flow diagram illustrating the operation of the system in searching and acting on triggers in a chat environment. At step 101 the system receives the chat text and parses it. At step 102 the system compares the chat text to its database of keywords and phrases. At decision block 103 the system determines if the text is in the database. If not, the system returns to step 101 and continues receiving and analyzing the chat text. If so at step 103, the system proceeds to decision block 104 and determines if there is a filter that would impact the trigger represented by the database match. This may occur when a user, for example, has indicated a preference for certain MMOs. In those cases, the user may not desire to have any information triggered by certain words or may prefer certain MMOs over others. In some embodiments, the user cannot define any filters. When a filter is present, the system returns to step 101.

If there is no filter active at decision block 104 the system proceeds to decision block 105 to determine if there are one or more MMOs that can be triggered by the detected word.

If there are one or more MMOs that are appropriate for the detected word, then the system proceeds to step 106 and selects an appropriate MMO to present to the user in the System Panel.

Although the above example is given with chat text, the text could come from other sources as well. All sources of text are suitable for review and for mining for triggers.

The System implements some filters of its own in one embodiment. For example, if a product has already appeared in the current session it will not reappear or duplicate during that session.

By default the newest (creation date) product (first priority) shows up first selected any time a new result appears and the user has not yet selected a product.

In one embodiment, any user engaged in a chat can see the System Panel appear with these results. When a user hovers over the result a small box appears giving them slightly more information (name, short description, review) allowing them to get a glimpse before clicking to the first detail version of the product.

If a user clicks on an MMO, and it is a product, the full details on that product will appear within the System Panel, allowing previewing of images/files, and access to a buy link.

If a details entry, media file or document was provided with a product, the [Media] and/or [Files] buttons is visible, if no files were added, there is no button visible to user. This detailed view is only reached by clicking the [More] button. The product can have further details added to it via admin and these can also be accessed from the detailed view.

Sales Stage/Buying Cycle Analysis

One aspect of the system is the ability to determine where in a buying cycle a user is and fine tune the MMO presentation accordingly. The system chooses a MMO based on where in the buying cycle a user is when an MMO is to be provided. An embodiment of the operation of this system is illustrated in the flow diagram of FIG. 2. At step 201 the system receives a trigger from a social media interaction. At step 202 the system determines which user is involved in the social communication. At step 203 the system determines where in the buying cycle the user is currently. At step 204 the system retrieves an MMO appropriate for that particular stage of they buying cycle and returns it to the System Panel at step 204.

In one embodiment, users are shown different MMOs depending on which stage of the buying cycle the user is in. As MMOs appear, the system also tracks sentiment of the conversation on the part of the user. Negative comments will cause an MMO to be removed from the display region while positive comments can cause it to appear in a "top result" position. In the embodiment shown, the top result position may be the left hand location of the display region. If the display region is oriented vertically, the top result position could be the top of the region. In other instances, the top result region could be indicated by special highlighting of the MMO, or the top result could appear in its own region separately from the MMO display region. The top result will change based on the ongoing conversation, sentiment, context, and sales cycle stage of the user.

FIG. 3 is a flow diagram illustrating how the system tracks sales stage for a user. At step 301 the system identifies the user and retrieves profile information from the user. At step 302 the system checks to see if the user has updated any profile information. This information, depending on the context, flows through a phase estimator and may indicate that the user is in one of the stages of the sales cycle (i.e. awareness, interest, desire, action). At step 303 the system tracks the social interaction of the user and uses keywords and trigger to determine a possible sales stage of the user. For example, if the user uses phrases such as "I know" or "I have heard of . . . " the system may interpret that as an awareness stage. Phrases such as "I want' or "I need" may indicate a desire stage of the sales cycle. At step 304 the system sets a flag for the user indicating which stage it is determined the user is in. At step 305 the system may actively provide MMOs to the user to help move the user to the next stage of the sales cycle.

The system defines different selling stage cycles for the consumer and the seller. The consumer stages are awareness, consideration, decision, and purchase. The seller stages are attention, interest, desire, and action. One goal of the system is to provide the appropriate MMO's for each stage of the cycle and in such a way as to maximize the chance of the consumer moving to the next stage of the sales cycle.

MMO's for the awareness/attention stage may include, but are not limited to, articles, press releases, product categories, directions, search engines, and the like. MMO's for the consideration/interest stage may include, but are not limited to, review sites, product comparisons, 3rd party reviews, price, warranty, peer reviews, and the like.

MMO's for the decision/desire stage may include, but are not limited to, merchant sites, review sites, brand specific research, detailed features, and case studies. MMO's for the purchase/action stage may include, but are not limited to, price, warranty, delivery schedule, service, and shipping information.

Context Estimator

Figure 13:
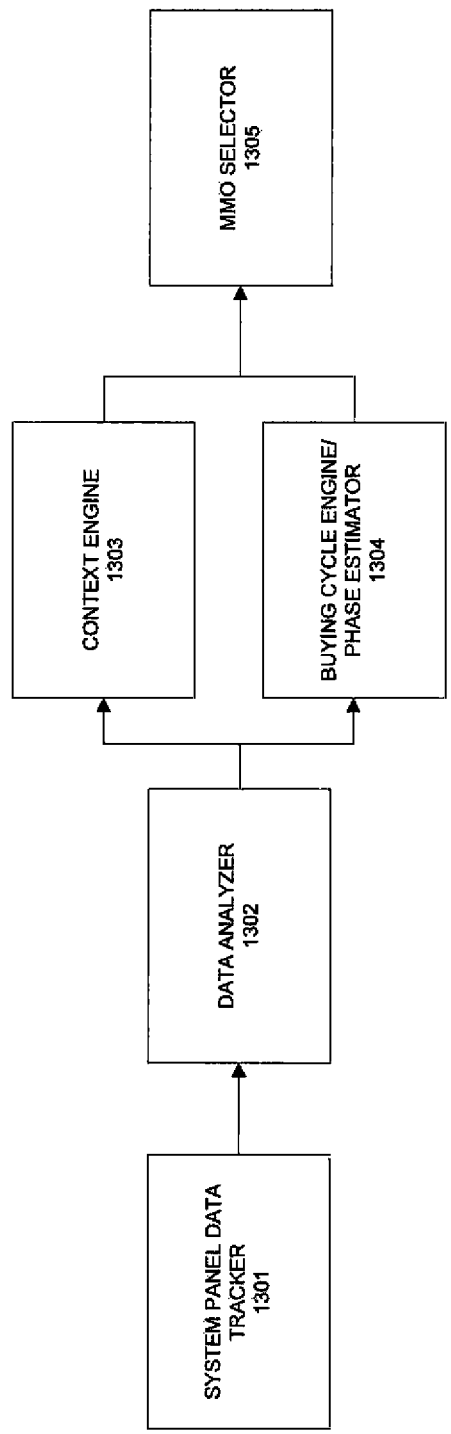
FIG. 13 is a block diagram illustrating an embodiment of a context estimator.

The identification of context in a marketing context in one embodiment is accomplished by determining sentiment, and by reviewing features, benefits, price, alternatives, and decision. In one embodiment, the system tracks a plurality of vectors and assigns scores in each vector as conversation or communication progresses. Based on the scores, the context and the buying cycle stage can be determined. FIG. 13 illustrates a block diagram of an embodiment of the system. System Panel Data Tracker 1301 monitors System Panels and sends data, conversations, mouse clicks, MMO clicks, and the like to Data Analyzer 1302. Data Analyzer 1302 parses the data and sends keywords, poll responses, and sentiment information, MMO clicks and the like to Context Engine 1303 and Buying Cycle Engine/Phase Estimator 1304. These engines output their results to MMO Engine 1305 where an appropriate MMO is selected based on the combined input of Context Engine 1303 and Buying Cycle Engine 1304.

The Context Engine 1303 in one embodiment uses the data provided to determine scores for the categories of Features, Benefits, Price, Alternatives, and Decision. The Buying Cycle Engine uses the data to determine scores for the categories of Attention, Interest, Desire, and Action. In one embodiment, the scores are based on the occurrence of a keyword or click that matches a category. For example, each conversation analysis that can be categorized as "Attention" increase the Attention score by one. By determining which category has the highest score, the phase estimator assigns a percentage to each of the four categories. For example, if there is one instance of an Attention occurrence, and two of "Interest", the phase estimator would assign 33% to Attention, 67% to Interest, and 0% to Desire and Action. Similarly, the Context Engine can increase the score in each of its categories by one for each occurrence of a conversation that matches that category. The scores are accumulated through a conversation so that appropriate MMO's can be selected. Based on the scores in these categories by the two engines, the MMO Engine 1305 will select one or more appropriate MMOs to return to a System Panel. In embodiment, the system offers MMOs in the next sales phase after a certain score or phase estimation is achieved in the prior sales phase. Reactions to these MMOs can gauge whether the user has transitioned to the next sales phase or not.

The buying phase can be determined in a number of ways. In one embodiment, the cycle is determined by parsing the conversation and identifying keywords, as well as noting which MMO's a user clicks on or at least mousse over. At the beginning of a conversation, the system may offer MMO's from two or more stages of the sales cycle to see which MMO the user selects. (This is also where the MMOs differ depending on the phase of the buying cycle as mentioned above). As the conversation continues, the use of keywords associated with a particular stage, or the showing of interest in MMO's of a particular stage, allows the system to know with more certainty which sales cycle the user is in. All of this data is fed to an "interactive dashboard" in real time. Some of the topics that are measured and published to the dashboard are; the top product categories, the top brands displayed, the most clicked through MMOs, and the results of the "question for you" polls.

In another embodiment, the system provides "questions for you" which are questions, polls, and/or surveys to a user, via MMO's or via interaction in the System Panel. The response to such queries will also help determine the present sales stage in the cycle. In one embodiment, the MMO's may consist of objects that provide information on features, price, benefits, alternatives, and decisions. Some of the MMO's in each category may be appropriate for more than one stage in the sales cycle, depending on the keywords in the conversation.

For example, a user may ask about price in the awareness/attention stage, or in any of the other stages. Therefore a price MMO might be appropriate in any of the stages. The reaction to a price MMO may indicate a movement in the cycle up or down or the user may remain in the same stage. A poor reaction to a price MMO signals the system to not move the user to the next stage of the sales cycle, while a positive reaction may indicate the users movement to the next stage.

General features may often be associated with the awareness/attention stage, while specific features may be associated with the desire stage.

Example Uses of Contextual Marketing

One example of how a brand can utilize the Contextual Marketing System platform is to load it into a traditional corporate website or into any type of community website. It will stimulate users to talk more about the company's products and services as well as purchase them. An example of this would be for a company such as DELL. DELL might sponsor and run a website for users or fans of their products.

A similar example, would be for a brand such as Woman's Day to allow their users to talk more about their traditional advertisers' products and services and purchase them, but Woman's Day can generate revenue from their advertisers by charging them to have their MMO libraries loaded and they can also charge them a percentage of each sale that is closed.

Another example may be for a TV network to offer a second broadcast opportunity for their talent to re-broadcast a program with the accompanying text and MMO related to the program.

Another example is applying the Context Based Search Engine platform to an educational environment related to career planning. As students chat with experts in various career fields and as they do, various resources will appear as an MMO to help students get a much better idea of what different careers are like.

User Reputation Management

User's participation in Ratings and Reviews, and other users' ratings on them, are directly tied to their reputation in the System. "Badges" are garnered by performing certain activities, and/or receiving ratings from other users and/or brands.

In one embodiment of the system, the user can gain reputation points by completing their profile fully, by recommending friends to the system, by having one of their reviews "liked" or "thumbed up" by other users, and by other activities. Uses can gain more reputation points by recommending a product to a friend, having a recommended product being clicked through by the person referred, or by posting product reviews. In one embodiment, the user may gain certain status badges for levels of points achieved. The status badges may be displayed in association with the user's avatar.

There may be other advantages to having badges and reputation points, such as access to more features, discount coupons, and the like.

Data Capture:

The Contextual Marketing System application has the ability to gather data from the users and serve it up in real time to a brand manager.

There are several ways to get this data. One way is through self-identification within the user's profile. Another way is being able to look at profile data from another application like Facebook. Another way is through monitoring actual behavior within a community.

Interactive Dashboard

FIG. 12 is an example of an interactive dashboard used in the system. The dashboard illustrated in FIG. 12 is accessible to Brand Managers using the system. The purpose of this feature is to allow a Brand Manager to graphically view specific information about the users and activity on the application.

This information could include the ability to generate visual reports regarding, for example, User activity, User Reputation leaders, Most mentioned keywords, Products with highest number of results, Most purchased products, Product Ratings, and the like.

Referring to FIG. 12, the interactive dashboard graphically illustrates real time data about the use of a Brand's system. For example, in region 1201, the system shows the total users and shows how many are in each phase of the buying cycle. Region 1202 shows the top active users and that region can be filtered by different types of activity, including buying, chatting, recommending, visiting, and the like. Region 1203 identifies and displays MMO click-throughs sorted by buying cycle stage. Those MMO's can be filtered by type of MMO such as coupons, comparison, advertisements, and the like. The dashboard can also display the top MMO's clicked in region 1204.

Questions for you region 1205 allows the manager to select any of the polls or questions available for presentation to a user and to see that latest results displayed graphically. Region 1206 shows the most used keywords and region 1207 shows the most called MMOs in the system. The dashboard may display other information retrieved from the system as desired.

Embodiment of Computer Execution Environment (Hardware)

Figure 11:
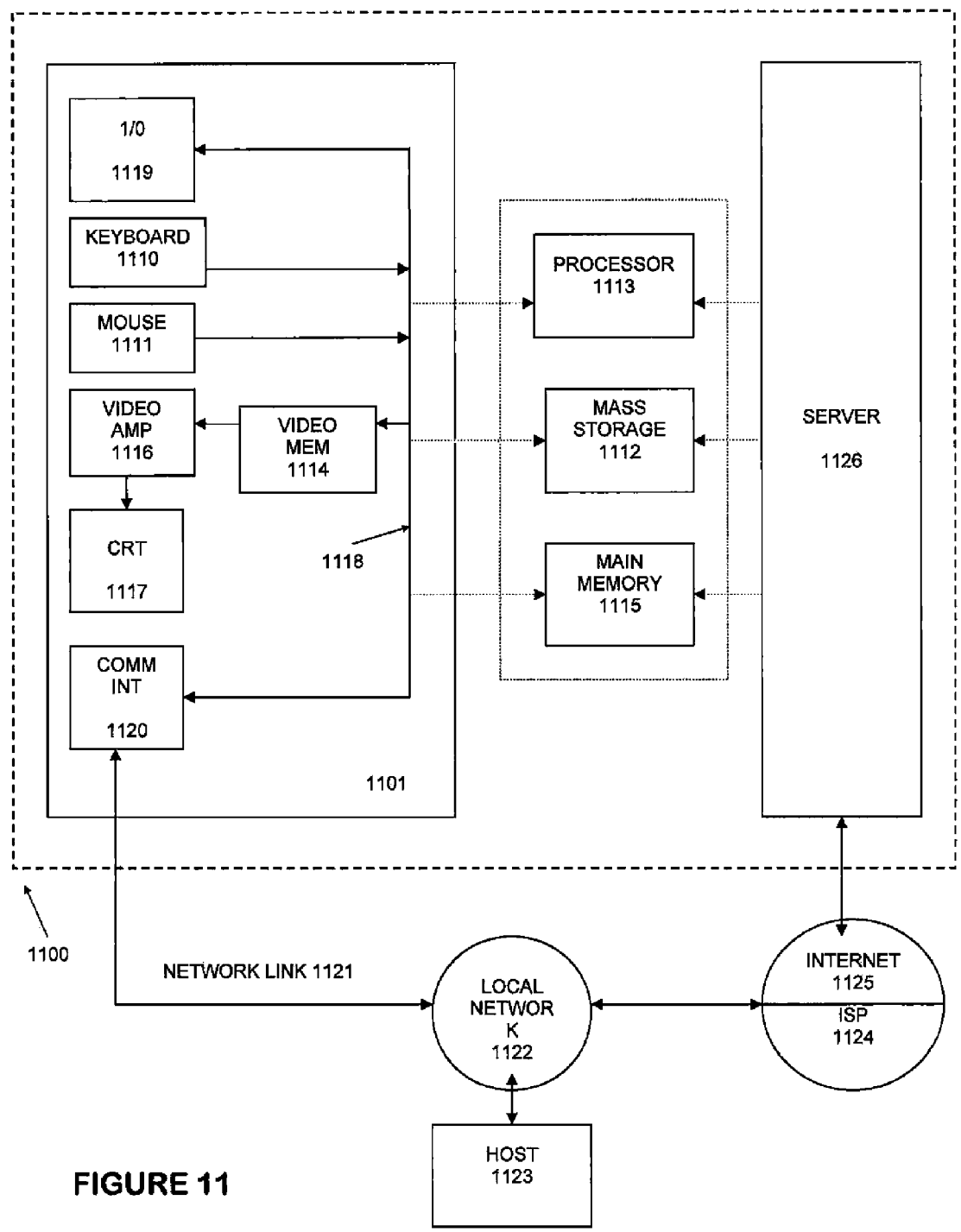
FIG. 11 is an example computer system for use with an embodiment of the system.

An embodiment of the system can be implemented as computer software in the form of computer readable program code executed in a general purpose computing environment such as environment 1100 illustrated in FIG. 11, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1110 and mouse 1111 are coupled to a system bus 1118. The keyboard and mouse are for introducing user input to the computer system and communicating that user input to central processing unit (CPU 1113. Other suitable input devices may be used in addition to, or in place of, the mouse 1111 and keyboard 1110. I/O (input/output) unit 1119 coupled to bi-directional system bus 1118 represents such I/O elements as a printer, A/V (audio/video) I/O, etc.

Computer 1101 may include a communication interface 1120 coupled to bus 1118. Communication interface 1120 provides a two-way data communication coupling via a network link 1121 to a local network 1122. For example, if communication interface 1120 is an integrated services digital network (ISDN) card or a modem, communication interface 1120 provides a data communication connection to the corresponding type of telephone line, which comprises part of network link 1121. If communication interface 1120 is a local area network (LAN) card, communication interface 1120 provides a data communication connection via network link 1121 to a compatible LAN. Wireless links are also possible. In any such implementation, communication interface 1120 sends and receives electrical, electromagnetic or optical signals which carry digital data streams representing various types of information.

Network link 1121 typically provides data communication through one or more networks to other data devices. For example, network link 1121 may provide a connection through local network 1122 to local server computer 1123 or to data equipment operated by ISP 1124. ISP 1124 in turn provides data communication services through the world wide packet data communication network now commonly referred to as the "Internet" 1125 Local network 1122 and Internet 1125 both use electrical, electromagnetic or optical signals which carry digital data streams. The signals through the various networks and the signals on network link 1121 and through communication interface 1120, which carry the digital data to and from computer 1100, are exemplary forms of carrier waves transporting the information.

Processor 1113 may reside wholly on client computer 1101 or wholly on server 1126 or processor 1113 may have its computational power distributed between computer 1101 and server 1126. Server 1126 symbolically is represented in FIG. 11 as one unit, but server 1126 can also be distributed between multiple "tiers". In one embodiment, server 1126 comprises a middle and back tier where application logic executes in the middle tier and persistent data is obtained in the back tier. In the case where processor 1113 resides wholly on server 1126, the results of the computations performed by processor 1113 are transmitted to computer 1101 via Internet 1125, Internet Service Provider (ISP) 1124, local network 1122 and communication interface 1120. In this way, computer 1101 is able to display the results of the computation to a user in the form of output.

Computer 1101 includes a video memory 1114, main memory 1115 and mass storage 1112, all coupled to bi-directional system bus 1118 along with keyboard 1110, mouse 1111 and processor 1113.

As with processor 1113, in various computing environments, main memory 1115 and mass storage 1112, can reside wholly on server 1126 or computer 1101, or they may be distributed between the two. Examples of systems where processor 1113, main memory 1115, and mass storage 1112 are distributed between computer 1101 and server 1126 include thin-client computing architectures and other personal digital assistants, Internet ready cellular phones and other Internet computing devices, and in platform independent computing environments, The mass storage 1112 may include both fixed and removable media, such as magnetic, optical or magnetic optical storage systems or any other available mass storage technology. The mass storage may be implemented as a RAID array or any other suitable storage means. Bus 1118 may contain, for example, thirty-two address lines for addressing video memory 1114 or main memory 1115. The system bus 1118 also includes, for example, a 32-bit data bus for transferring data between and among the components, such as processor 1113, main memory 1115, video memory 1114 and mass storage 1112. Alternatively, multiplex data/address lines may be used instead of separate data and address lines.

In one embodiment of the invention, the processor 1113 is a microprocessor such as manufactured by Intel, AMD, Sun, etc. However, any other suitable microprocessor or microcomputer may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the cathode ray tube (CRT) raster monitor 1117. Video amplifier 1116 is well known in the art and may be implemented by any suitable apparatus. This circuitry converts pixel data stored in video memory 1114 to a raster signal suitable for use by monitor 1117. Monitor 1117 is a type of monitor suitable for displaying graphic images.

Computer 1101 can send messages and receive data, including program code, through the network(s), network link 1121, and communication interface 1120. In the Internet example, remote server computer 1126 might transmit a requested code for an application program through Internet 1125, ISP 1124, local network 1122 and communication interface 1120. The received code maybe executed by processor 1113 as it is received, and/or stored in mass storage 1112, or other non-volatile storage for later execution. In this manner, computer 1100 may obtain application code in the form of a carrier wave. Alternatively, remote server computer 1126 may execute applications using processor 1113, and utilize mass storage 1112, and/or video memory 1115. The results of the execution at server 1126 are then transmitted through Internet 1125, ISP 1124, local network 1122 and communication interface 1120. In this example, computer 1101 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

What is claimed is:
1. A method for providing contextual information to a user of a communication system comprising, in a processing system:
    parsing a conversation between a user and a participant in the communication system;
    determining whether the user is in a an awareness stage of a buying cycle, a consideration stage of the buying cycle, a decision stage of the buying cycle or a purchasing stage of the buying cycle;
    identifying an appropriate matching search result based on the conversation and the stage of the buying cycle that the user is in; and displaying the search result to the user, wherein
if the user is in the awareness stage, the search result is selected from a group comprising articles, press releases, product categories, directions and search engines;
if the user is in the consideration stage, the search result is selected from a group comprising review sites, product comparisons, third party reviews, price, warranty and peer reviews;
if the user is in the decision stage, the search result is selected from a group comprising merchant sites, review sites, brand specific research, detailed features and case studies; and
if the user is in the purchasing stage, the search result is selected from a group comprising price, warranty, delivery schedule, service and shipping information.

2. The method of claim 1, wherein the search result is a matching media object (MMO).

* * * * *